Patented July 4, 1950

2,514,181

UNITED STATES PATENT OFFICE 2,514,181

VULCANIZATION PROCESS

George E. P. Smith, Jr., Akron, Ohio, assignor to The Firestone Tire & Rubber Company, Akron, Ohio, a corporation of Ohio No Drawing. Application April 9, 1945,
Serial No. 587,439

4 Claims. (Cl. 260—788)

This invention relates to new compounds which are accelerators of the vulcanization of rubber. It includes the new compounds, the process of vulcanizing, and the vulcanized product.

The new compounds are N,N'-dialkylene bis-sulfenamides of the group consisting of the bis-thiazyl sulfenamides, the bis-thiazolinyl sulfenamides, and the bis-thiocarbamyl sulfenamides. The dialkylene amino groups are preferably of the piperazine type obtained by carrying out the reaction with a piperazine, either an unsubstituted piperazine or a substituted piperazine, such as methyl piperazine or 2,5-dimethyl piperazine, etc.

The new products which are accelerators are represented by the general formula:

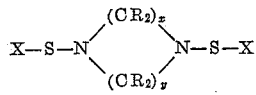

where R is hydrogen or a hydrocarbon radical, X is thiazyl, thiazolinyl or thiocarbamyl, and $x$ and $y$ are whole numbers, usually not greater than about 16 and preferably are 1, 2 or 3. $x$ and $y$ may be the same, as where piperazine or a dialkyl piperazine is used in producing the compounds; or they may be different, as, for example, where either of the following is used:

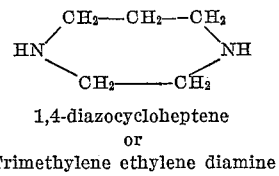

1,4-diazocycloheptene
or
Trimethylene ethylene diamine

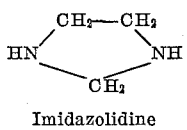

Imidazolidine

The compounds of this invention may be obtained by any usual method of preparing the sulfenamides. The following examples are illustrative:

Example 1

A solution of 10 grams of 2-mercaptobenzothiazole was prepared with 5.5 grams of sodium hydroxide in 100 to 200 cc. of water. The solution of sodium mercaptobenzothiazole was filtered and to it was added 46.4 grams of piperazine hexahydrate. The solution was diluted somewhat, and while being cooled and stirred, it was treated with 15.2 grams of iodine in dilute aqueous potassium iodide solution. The first precipitate was colored and poor, and this was filtered off and discarded. After adding an additional 23.2 grams of piperazine hexahydrate, further oxidation produced a white- or cream-colored solid. This was in part pasty, and when dry, it melted over a wide range from 130° to 140° C. and up. It was obviously a mixture of products containing the desired bis-sulfenamide. On repeated recrystallization, a product melting at 190° to 192° C. is obtained.

Analysis:
Found: %N=13.4, %S=30.65. Calculated for N,N'-piperazino bis(benzothiazyl sulfenamide): %N=13.45, %S=30.75.

Example 2

A solution of the sodium salt of 2-mercapto 4,5-dimethyl thiazole was prepared from 7.5 grams of the mercaptothiazole and 4.74 grams of sodium hydroxide in several hundred cubic centimeters of water. This was filtered, and to it were added, first, 50 grams and then another 50 grams (total=100 grams) of piperazine hexahydrate. The solution was cooled and stirred while 13.15 grams of iodine in aqueous potassium iodide was slowly added. A cream-colored, finely divided solid was formed. This melted at 140° to 145° C. On purification a product melting at 153.5° to 154° C. is obtained.

Analysis:
Found: %N=15.4, %S=34.7. Calculated for N,N'-piperazine bis(4,5-dimethyl thiazyl sulfenamide): %N=15.2, %S=34.4.

Other accelerators of the invention include:
N,N'-piperazine bis(4-methyl thiazyl sulfenamide)
N,N'-2,5-dimethyl piperazine bis(4-ethyl thiazyl sulfenamide)
N,N'-piperazine bis(dimethyl thiocarbamyl sulfenamide)
N,N'-piperazine bis(thiazolinyl sulfenamide)
N,N'-trimethylene ethylene diamine bis(benzothiazyl sulfenamide)
N,N'-imidazolidine bis(benzothiazyl sulfenamide)

N,N'-piperazine bis(benzothiazyl sulfenamide) and N,N'-piperazine bis(4,5-dimethyl thiazyl sulfenamide), prepared according to the above two examples, were tested as accelerators of rubber and compared with N-cyclohexyl benzothiazyl sulfenamide as a control, by first compounding them according to the following formula:

| | Parts by weight |
|---|---|
| Rubber | 100 |
| Sulfur | 3 |
| Stearic acid | 1.10 |
| Zinc oxide | 5 |
| Accelerator | 0.75 |

These stocks were cured at different temperatures for different periods of time with the following results:

| Cured at 240° F. | 600% Modulus | | | Tensile at Break | | |
|---|---|---|---|---|---|---|
| | 30 | 40 | 120 | 30 | 60 | 120 |
| Control | | | 2,200 | | | 4,150 |
| Example 1 | | | 725 | | | 2,850 |
| Example 2 | | | 850 | | | 2,675 |

| Cured at 280° F. | 600% Modulus | | | | Tensile at Break | | | |
|---|---|---|---|---|---|---|---|---|
| | 20 | 40 | 60 | 100 | 20 | 40 | 60 | 100 |
| Control | 1,500 | 2,525 | 2,100 | 1,450 | 3,925 | 3,825 | 3,500 | 3,500 |
| Example 1 | | 2,150 | 1,750 | 1,400 | | 3,750 | 3,450 | 3,300 |
| Example 2 | 525 | 1,775 | 2,150 | 1,800 | 2,700 | 3,450 | 3,675 | 3,075 |

The times of cure are given in minutes immediately below the Modulus and tensile headings in the above tables.

It is seen that these compounds are excellent delayed-action accelerators.

Although the above figures relate to the vulcanization of natural rubber, the invention is not limited to the treatment of that particular material. It includes, also, the curing of synthetic rubber-like materials and other plastics. The examples are merely illustrative of the action of these accelerators on sulfur in any curing operation. Although they relate particularly to the bis-sulfenamides, sulfenamides containing a single sulfur atom connected with a cyclic diamine which also are accelerators may be similarly prepared.

What I claim is:

1. The method of vulcanizing rubber which comprises heating the same to a curing temperature with sulfur in the presence of a small amount of an accelerator which is a sulfenamide of the following formula:

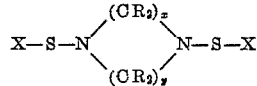

in which R is from the group consisting of hydrogen and a hydrocarbon radical, X is from the group consisting of thiazyl, thiazolinyl and thiocarbamyl, and $x$ and $y$ are whole numbers.

2. The method of vulcanizing rubber which comprises heating the same to a curing temperature with sulfur in the presence of a small amount of an accelerator which is a N,N'-piperazino bis-sulfenamide of the group consisting of the thiazyl sulfenamides, the thiazolinyl sulfenamides, and the thiocarbamyl sulfenamides.

3. Rubber which has been vulcanized in the presence of an accelerator which is a sulfenamide of the following formula:

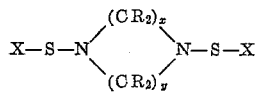

in which R is from the group consisting of hydrogen and a hydrocarbon radical, X is from the group consisting of thiazyl, thiazolinyl and thiocarbamyl, and $x$ and $y$ are whole numbers.

4. Rubber which has been vulcanized in the presence of an accelerator which is a N,N'-piperazino bis-sulfenamide of the group consisting of the thiazyl sulfenamides, the thiazolinyl sulfenamides, and the thiocarbamyl sulfenamides.

GEORGE E. P. SMITH, Jr.

REFERENCES CITED

The following references are of record in the file of this patent:

UNITED STATES PATENTS

| Number | Name | Date |
|---|---|---|
| 1,616,994 | Sebrell | Feb. 8, 1927 |
| 1,732,486 | Scott | Oct. 22, 1929 |
| 2,271,834 | Carr | Feb. 3, 1942 |
| 2,345,236 | Chitwood | Mar. 28, 1944 |
| 2,354,427 | Carr | July 25, 1944 |
| 2,382,793 | Howland | Aug. 14, 1945 |